(12) United States Patent
Kirschner et al.

(10) Patent No.: US 8,091,813 B2
(45) Date of Patent: Jan. 10, 2012

(54) BI-MODAL ROLLER GRINDER

(75) Inventors: Jonathan Kirschner, Powder Springs, GA (US); Louis Joseph Heinsz, Fayetteville, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 12/372,068

(22) Filed: Feb. 17, 2009

(65) Prior Publication Data

US 2009/0145988 A1 Jun. 11, 2009

Related U.S. Application Data

(62) Division of application No. 11/162,339, filed on Sep. 7, 2005, now abandoned.

(51) Int. Cl.
B02B 7/02 (2006.01)
B02C 23/00 (2006.01)

(52) U.S. Cl. ......................... 241/100; 241/143; 241/159

(58) Field of Classification Search .................. 241/100, 241/159, 30, 143
See application file for complete search history.

(56) References Cited

U.S. PATENT DOCUMENTS

| | | | | |
|---|---|---|---|---|
| 2,085,376 A * | 6/1937 | Maede | ............................ | 241/10 |
| 2,182,131 A * | 12/1939 | Maede | ............................ | 241/143 |
| 2,931,727 A * | 4/1960 | Kraut | ............................ | 426/432 |
| 3,167,261 A * | 1/1965 | Wonneberger | ............................ | 241/159 |
| 3,190,572 A * | 6/1965 | Goto | ............................ | 241/159 |
| 3,511,666 A * | 5/1970 | Richards et al. | ............................ | 426/394 |
| 3,660,106 A * | 5/1972 | McSwiggin et al. | ............................ | 426/465 |
| 3,762,930 A * | 10/1973 | Mahlmann | ............................ | 426/594 |
| 3,801,716 A * | 4/1974 | Mahlmann | ............................ | 426/466 |
| 4,053,652 A * | 10/1977 | Mahlmann | ............................ | 426/388 |
| 4,101,083 A * | 7/1978 | Faist | ............................ | 241/285.1 |
| 4,267,200 A * | 5/1981 | Klien et al. | ............................ | 426/595 |
| 4,442,980 A * | 4/1984 | Oetiker et al. | ............................ | 241/34 |
| 4,591,508 A * | 5/1986 | Pultinas, Jr. | ............................ | 426/595 |
| 4,602,558 A * | 7/1986 | Kaper et al. | ............................ | 99/289 R |
| 4,619,408 A * | 10/1986 | Sangati | ............................ | 241/34 |
| 4,655,400 A * | 4/1987 | Erb et al. | ............................ | 241/29 |
| 5,160,757 A * | 11/1992 | Kirkpatrick et al. | ............................ | 426/466 |
| 5,227,188 A * | 7/1993 | Leppla et al. | ............................ | 426/595 |
| 5,381,969 A * | 1/1995 | Paulig | ............................ | 241/36 |
| 5,407,138 A * | 4/1995 | Graenicher et al. | ............................ | 241/6 |
| 6,145,767 A * | 11/2000 | Hostettler | ............................ | 241/135 |
| 6,732,963 B2 * | 5/2004 | Kasada et al. | ............................ | 241/135 |
| 7,763,300 B2 * | 7/2010 | Sargent et al. | ............................ | 426/594 |

* cited by examiner

*Primary Examiner* — Bena Miller

(74) *Attorney, Agent, or Firm* — Sutherland Asbill & Brennan LLP (57) ABSTRACT

A grinder for grinding a material. The grinder may include a number of first rollers for grinding the material to a grind of substantially a first predetermined particle size and a number of adjustable second rollers for grinding a portion of the grind of the first predetermined particle size to a grind of substantially a second predetermined particle size.

4 Claims, 6 Drawing Sheets

BI-MODAL ROLLER GRINDER

RELATED APPLICATIONS

The present application is a divisional of U.S. patent application Ser. No. 11/162,339, entitled "Bi-Modal Roller Grinder", filed on Sept. 7, 2005. U.S. application Ser. No. 11/162,339 is incorporated herein by reference in full.

TECHNICAL FIELD

The present invention relates generally to methods and devices for grinding coffee beans or similar materials and more particularly relates to methods and devices for grinding coffee beans or similar materials so as to provide both large and fine particles and/or any desired particle size distribution.

BACKGROUND OF THE INVENTION

Making a good cup of espresso is often considered an art form. Traditionally, the best espresso is made by a barista, a person highly skilled in controlling the variables that result in a finely brewed cup of espresso. These variables include brew water temperature and pressure, coffee weight, age, moisture, particle size, tamp pressure, etc. These variables contribute to the resistance that the coffee creates and allows the water to perform the required brewing work.

The barista generally uses an adjustable burr grinder to grind a dose of coffee. The particle sizes that the burr grinder produces, however, may be widely variable. A variable particle size distribution may cause the coffee to have an off taste. For example, a grind with too many large particles may be under brewed while a grind with too many small particles may be over brewed. Particularly, the use of the smaller particles may provide an undesirable level of bitterness.

There is a desire, therefore, for methods and devices that provide a desired particle size distribution on a consistent basis. Preferably, the methods and devices should be adaptable to providing grinds with any desired particle size distribution.

SUMMARY OF THE INVENTION

The present application thus describes a grinder for grinding a material. The grinder may include a number of first rollers for grinding the material to a grind of substantially a first predetermined particle size and a number of adjustable second rollers for grinding a portion of the grind of the first predetermined particle size to a grind of substantially a second predetermined particle size.

The grinder may be a roller grinder. The first rollers may include a pair of crusher rollers. The first rollers also may include a pair of finish rollers. The first predetermined particle size may be about 200 to about 300 microns. The adjustable second rollers may include a pair of fines rollers. The adjustable second rollers may include a length less than the first rollers. The adjustable second rollers may include a length of about half of the first rollers. The adjustable second rollers may include an engagement with the first rollers of zero to about one hundred percent. The second predetermined particle size may be at least about forty microns. The adjustable second rollers may include a fixed roller and an adjustable roller. The grinder further may include a densifier.

The present application further may describe a coffee grinder for grinding coffee beans. The coffee grinder may include a number of crusher rollers to provide coffee grinds, a number of finishing rollers to finish the coffee grinds to substantially a first predetermined particle size, and a number of adjustable fines rollers for grinding a portion of the coffee grinds to substantially a second predetermined particle size.

The grinder may be a roller grinder. The first predetermined particle size may be about 200 to about 300 microns. The adjustable second rollers may include a length less than the first rollers. The adjustable second rollers may include a length of about half of the first rollers. The adjustable second rollers may include an engagement with the first rollers of zero to about one hundred percent. The second predetermined particle size may be at least about forty microns.

The present application further describes a method of grinding coffee beans. The method may include the steps of grinding a first amount of beans in a first set of rollers to a particle size of substantially about 250 microns, grinding a second amount of the beans in a second set of rollers to a particle size of substantially about 40 microns, and combining the first amount of beans and the second amount of beans. The particle size of substantially about 250 microns may be about 250 microns plus or minus about 20 microns and the particle size of substantially about 40 microns may be about 40 microns plus or minus about 10 microns. The second amount of beans may include a portion on the first amount of beans.

These and other features of the present invention will become apparent upon review of the following detailed description of the preferred embodiments when taken in conjunction with the drawings and the appended claims.

DETAILED DESCRIPTION

Commonly owned U.S. Pat. No. 6,786,134, entitled "COFFEE AND TEA DISPENSER"; U.S. patent application Ser. No. 10/604,445, entitled "COFFEE AND TEA POD", now allowed (U.S. 2005-0016383 A1), and U.S. patent application Ser. No. 10/908,350, entitled "COFFEE AND TEA POD", filed on May 9, 2005, are incorporated herein by reference.

Referring now to the drawings, in which like numerals refer to like elements throughout the several views, FIGS. 1-7 show an embodiment of a pod cartridge 100 that may be used herein. The pod cartridge 100 may be used with a beverage dispenser system such as that described in commonly owned U.S. Pat. No. 6,786,134 or other types of beverage systems. Although the pod cartridge 100 is described in detail herein, any other type of receptacle may be used herein. The pod cartridge 100 may be used with an amount of a brewing material 105, such as coffee grinds, tea leaves, powders or any type of mixable material, flavorings, additives, or other types of materials.

The pod cartridge 100 may be substantially in the shape of a cup 110. The cup 110 may be made out of a conventional thermoplastic such as polystyrene, polyethylene, polypropylene and similar types of materials. Alternatively, stainless steel or other types of substantially non-corrosive materials also may be used. The cup 100 may be substantially rigid so as to withstand the heat and pressure of the brew cycle without imparting any off-tastes. By the term "rigid", we mean that the cup 110 may flex or deform slightly while under pressure.

The cup 110 may include a substantially circular sidewall 120 and a substantially flat base 130. Other shapes also may be used. The sidewall 120 and the base 130 of the cup 110 may be molded and form a unitary element or a separate sidewall 120 and a separate base 130 may be fixably attached to each other. The sidewall 120 and the base 130, as well as the cup 110 as a whole, may have any convenient diameter so as to accommodate the desired beverage dispenser system or similar types of devices.

The sidewall 120 and the base 130 of the cup 110 may take any desired or convenient size or shape. For example, the sidewall 120 may be straight, tapered, stepped, or curved if desired. By way of example, the sidewall 120 may have an inside diameter of about 39.3 millimeters (about 1.549 inches) with a wall thickness of about 1.1 millimeters (about 0.043 inches). Any other sizes or dimensions may be used herein as desired.

The pod cartridge 100 as a whole may have a variable depth depending upon the amount of brewing material 105 intended to be used therein. In the case of the pod cartridge 100 intended to be used for about a 355 milliliter beverage (about twelve (12) ounces), the pod cartridge 100 may have a total height of about 28.7 millimeter (about 1.13 inches) and a useable inside height of about 17.1 millimeters (about 0.674 inches). The height to diameter ratio for the 355 milliliter pod cartridge 100 therefore may be about 0.73 for the total height and about 0.435 for the usable inside height. The pod cartridge 100 may have about 6.4 grams of a polypropylene material.

A pod cartridge 100 to be used with, for example, about a 237 milliliter beverage (about eight (8) ounces) may have a height of about 22.5 millimeters (about 0.887 inches) and a usable inside height of about 11.8 millimeter (about 0.463 inches). The ratio thus may be about 0.57 for the total height and about 0.3 for the usable inside height. The pod cartridge 100 may have about 5.8 grams of a polypropylene material.

These ratios between diameter and depth provide the cup 100 and the pod cartridge 100 as a whole with sufficient strength and rigidity while using a minimal amount of material. The pod cartridge 100 as a whole may have about five (5) to about eight (8) grams of plastic material therein when using, for example, a polypropylene homopolymer. As a result, the cup 110 and the pod cartridge 100 as a whole may withstand temperatures of over about 93 degrees Celsius (about 200 degrees Fahrenheit) for up to sixty (60) seconds or more at a hydraulic pressure of over about ten (10) bar (about 150 pounds per square inch). Although the pod cartridge 100 having these ratios may flex or deform somewhat, the pod cartridge 100 as a whole should withstand the expected water pressure passing therethough. These dimensions and characteristics are for the purpose of example only.

The base 130 may include a number of apertures 140 formed therein. The apertures 140 may extend through the width of the base 130. The apertures 140 may be largely circular in shape with a diameter each of about 1.6 millimeters (about 0.063 inches). Any desired shape or size, however, may be used. In this embodiment, about 54 apertures 140 are used herein, although any number may be used. The selected number and size of apertures 140 provide the appropriate pressure drop when a pod cartridge 100 of a given dimension is used.

The base 130 also may have a number of support ribs 150 positioned thereon. Any desired number, shape, and/or positioning of the ribs 150 may be used. In this example, an inner circular rib, an outer circular rib, and a number of radial ribs may be used. The ribs 150 may have a depth of about one (1) millimeter (about 0.04 inches), although any desired thickness may be used. The design of the ribs 150 also provides increased support and stability to the pod cartridge 100 as a whole with a minimum amount of material.

The sidewall 120 of the pod cartridge 100 also may include an upper lip 160. The upper lip 160 may include a substantially flat top portion 170. The flat top portion 170 may have a width of about 3.45 millimeters (about 0.136 inches) and a height in the vertical direction of about 3.4 millimeters (about 0.135 inches). The lip 160 may be configured to accommodate the size of the desired beverage dispenser system or similar types of devices as well as the expected force of the hot water while using as little material as possible. This is particularly true given that the cartridge 100 as a whole generally may be supported only about its lip 160 during the injection process.

The sidewall 120 of the cup 110 also may include a number of cutouts 180 formed therein. In this embodiment, three (3) cutouts 180 may be used. Any number of cutouts 180, however, may be used depending upon the amount of material to be placed therein. For example, only two (2) cutouts 180 may be used with a 237 milliliter (about an eight (8) ounce) pod cartridge 100. The cutouts 180 may be continuous around the inner circumference of the sidewalls 120 and/or the cutouts 180 may be intermittent.

The cutouts 180 may cooperate with a lid 190. The lid 190 may have an edge 200 that is substantially wedge-shaped about its perimeter for insertion within a cutout 180. The use of the cutouts 180 ensures that the lid 190 remains in place. The edge 200 may be continuous or intermittent so as to mate with the cutouts 180. The lid 190 preferably is bowed inwardly or may be largely concave in shape. The lid 190 may have about 0.8 grams of a polypropylene material.

The lid 190 may be placed in one of the cutouts 180 depending upon the amount of brewing material 105 that is to be placed in the pod cartridge 100. The lid 190 may be bowed downward in a concave shape so as to tap the brewing 105 down under pressure and to keep the brewing material 105 therein from shifting. The lid 190 may provide the correct tamp force to the brewing material 105 and holds the material under load via essentially a Bellville washer principle. The use of the lid 190 to tamp the brewing material 105 also permits a faster fill rate when loading the pod cartridge 100. The lid 190 also may have a number of apertures 210 therein so as to permit water from the beverage dispenser system or similar types of devices to pass therethrough. Depending upon the nature of the beverage dispenser system, the use of the lid 190 may not be necessary.

The pod cartridge 100 may be lined with one or more layers of a filter paper 220. The filter paper 220 may be standard filter paper used to collect the brewing material 105 while allowing the beverage to pass therethrough. The filter paper 220, however, should have sufficient strength, stiffness, and/or porosity such that it does not deflect into the apertures 210 of the base 130 and/or allows fine particles of the brewing material 105 to close or clog the apertures 210. Clogging the apertures 210 may create an imbalance in the pressure drop though the pod cartridge 100. Because of the stiff paper 220 that substantially resists deformation, the apertures 210 of the base 130 of the cup 110 may have a somewhat larger diameter for increased flow therethrough.

For example, the filter paper 220 may be made with a combination of cellulose and thermoplastic fibers. Examples of suitable filter papers 220 are sold by J. R. Crompton, Ltd. of Gainesville, Ga. under the designations PV-377 and PV 347C. For example, the PV-347C material may have a grammage of about forty (40) grams per square meter and a wet burst strength of about 62 kilopascals. Similar types of materials may be used. Multiple sheets of paper also may be used. The multiple sheets each may have the same or differing characteristics.

The pod cartridge 100 may have a number of layers of the filter paper 220, in this case an upper layer and a lower filter layer. The lower layer of the filter paper 220 is generally positioned therein without the use of adhesives. The upper layer of the filter paper 220 may not need as much strength as the lower layer. The upper layer of the filter paper 220 generally provides water dispersion and prevents the grinds from clogging the beverage dispenser system or similar types of devices. The brewing material 105 itself may be positioned between the upper and lower layers of the filter paper 220. Preferably, the brewing material 105 is in direct contact with the sidewall 120, i.e., there is no filter paper 220 position around the inner diameter of the cup 110. This positioning forces the water to travel through the brewing material 105 itself as opposed to traveling through the cup 110 via the filter paper 220.

The brewing material 105 may be placed within a foil envelope or other type of substantially air impermeable barrier. The foil envelope may serve to keep the brewing material 105 therein fresh and out of contact with the ambient air. Alternatively, the entire pod cartridge 100 may be placed within a foil envelope, either individually or as a group, until the pod cartridge 100 is ready for use.

Figure 1:
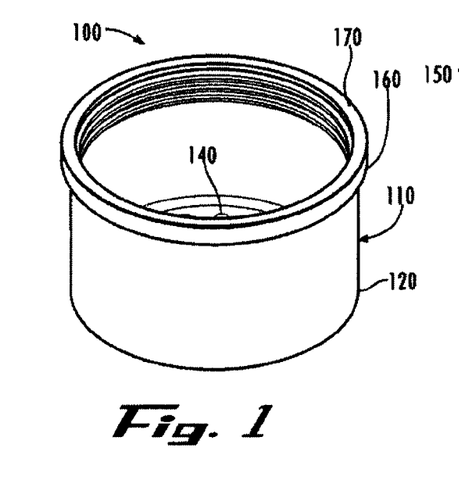
FIG. 1 is a top perspective view of a pod for use with the invention as described herein.
Figure 2:
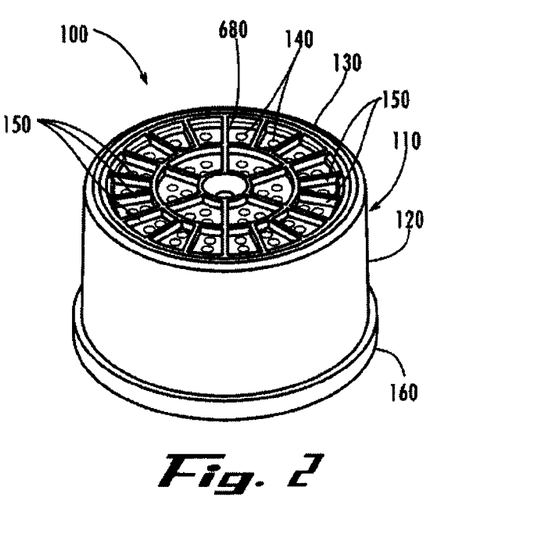
FIG. 2 is a bottom perspective view of the pod of FIG. 1.
Figure 3:
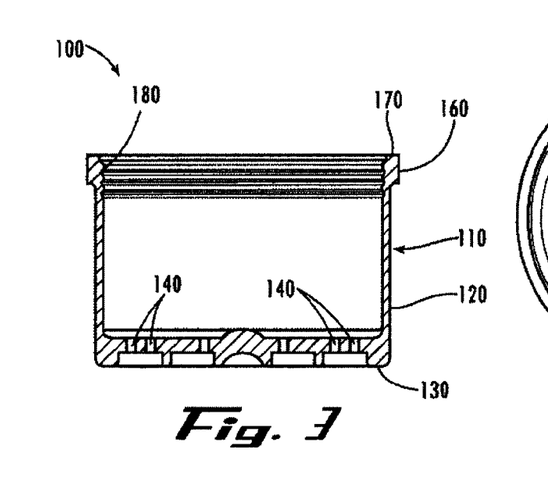
FIG. 3 is a side cross-sectional view of the pod of FIG. 1.
Figure 4:
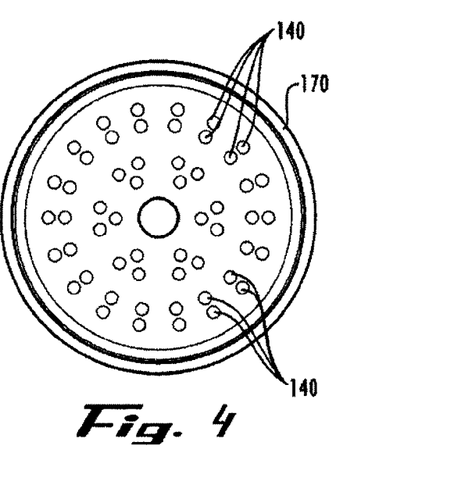
FIG. 4 is a top plan view of the pod of FIG. 1.
Figure 5:
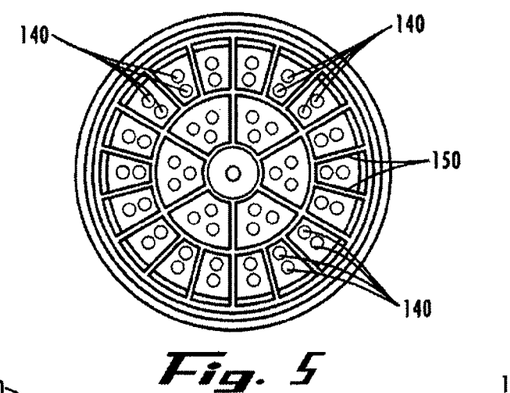
FIG. 5 is a bottom plan view of the pod of FIG. 1.
Figure 6:
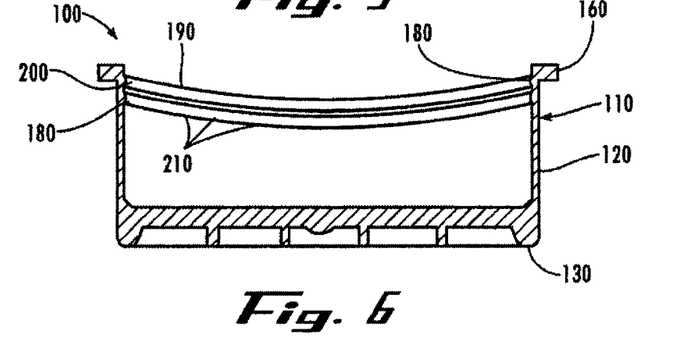
FIG. 6 is a side cross-sectional view of a pod showing the lid.
Figure 7:
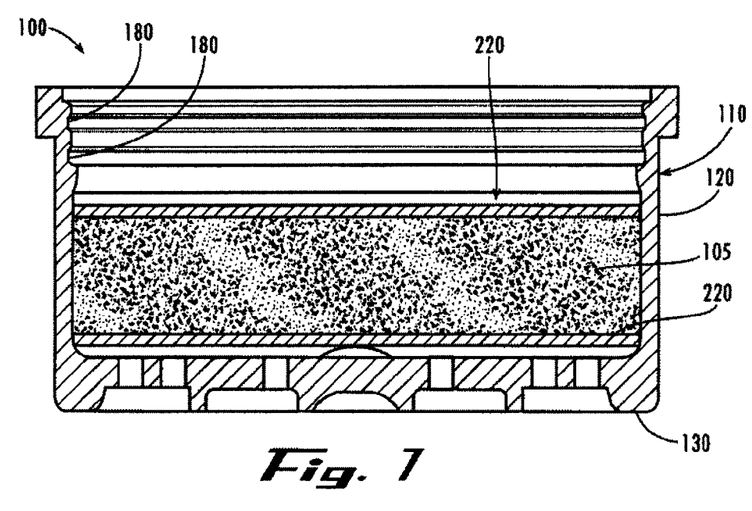
FIG. 7 is a side cross-sectional view of a pod cartridge with an amount of brewing material positioned therein.
Figure 8:
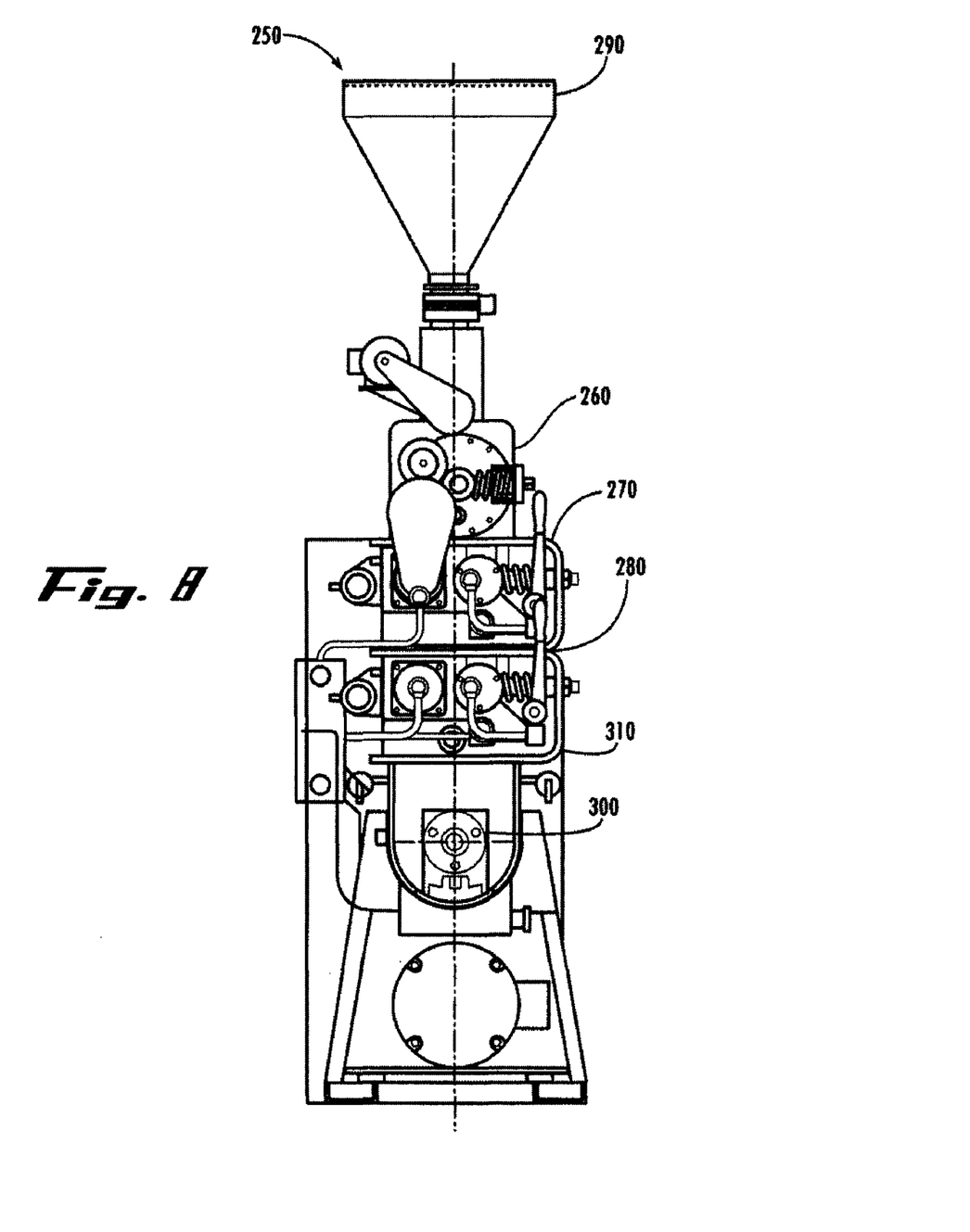
FIG. 8 is a front plan view of a grinder as is described herein.
Figure 9:
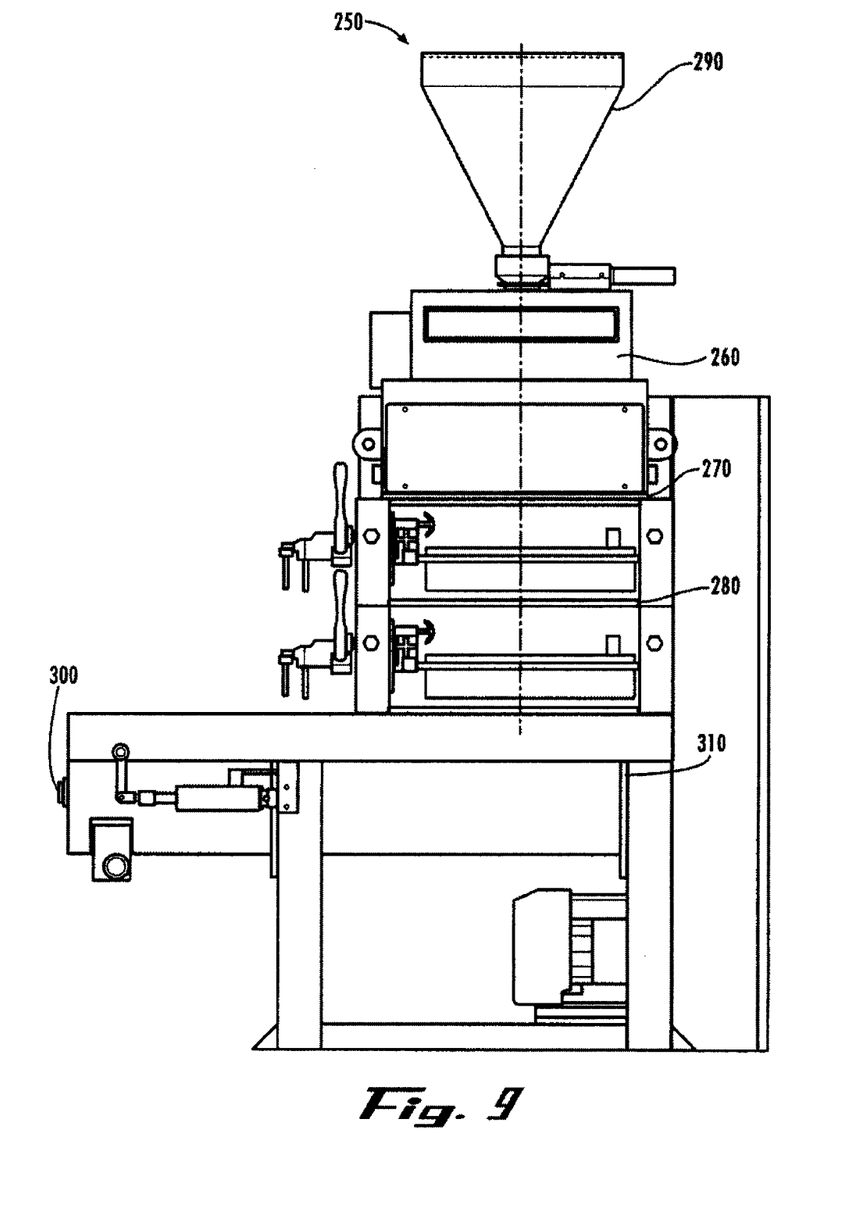
FIG. 9 is a side plan view of the grinder of FIG. 8.

The brewable material 105 itself usually is prepared in a grinder 250. The grinder 250 may take the raw material, coffee beans in this example, and grind them into coffee grinds. Other materials may be used herein. As is shown in FIGS. 8-10, the grinder 250 preferably is a roller grinder. An example of such a roller grinder 250 is manufactured by Modern Process Equipment, Inc. of Chicago, Ill. under the designation of models 660FX, 666EX.WC, 888EX.WC, and similar models. As described below, the roller grinder 250 is preferred over other types of grinders such as a burr grinder.

In this example, the grinder 250 may have three (3) stages of rollers. The first stage may be a pair of crusher rollers 260. The second stage may be a pair of finish rollers 270. The final stage may be a pair of fines rollers 280. Any number of rollers 260, 270, 280 may be used herein. The rollers 260, 270, 280 may be adjusted to produce grinds on any desired particle size. The grinder 250 may also include an inlet bin 290 and an outlet portal 300. Other configurations of the grinder 250 may be used herein.

As is shown in FIGS. 10A-10D, the fines rollers 280 may be maneuverable with respect to each other so as to vary the percentage of fines added to the larger particles. In this example, the amount of engagement between the fines rollers 280 may vary from none to about one hundred percent (100%). The fines rollers 280, however, may have a smaller length than the other rollers 260, 270. Specifically, if the rollers 260, 270 have a length of about thirty (30) inches (about 76.2 centimeters), then the fines rollers 280 may have a length of about fifteen (15) inches (about 38.1 centimeters). As such, the maximum amount of engagement of the fines rollers would produce about fifty percent (50%) fines. The fines rollers 280, however, may be adjusted for any desired amount of engagement. Likewise, the fines roller 280 may have any length.

Figure 10A:
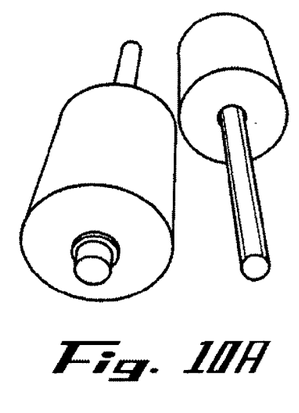
FIGS. 10A-10D are perspective views of the fines roller positions for use in the grinder of FIG. 8.
Figure 10B:
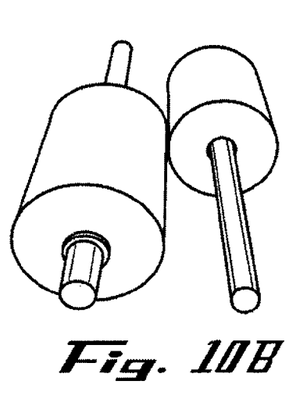
Figure 10C:
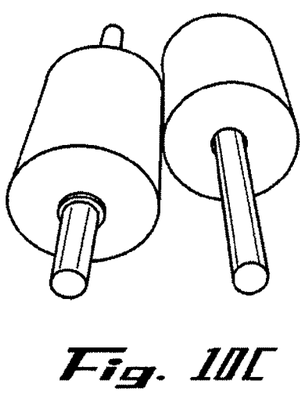
Figure 10D:
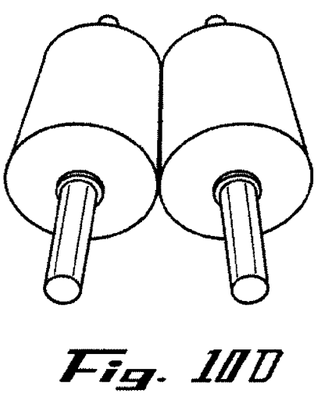

No engagement between the rollers 280 as is shown in FIG. 10A would provide no fines, twenty percent (20%) engagement as is shown in FIG. 10B would provide about ten percent (10%) fines, fifty percent (50%) engagement as is shown in FIG. 10C would provide about twenty-five percent (25%) fines, and one hundred percent (100%) engagement would provide about fifty percent (50%) fines. Any desired percentage of fines can be produced. The fines may be as small as about forty (40) microns. Any desired size may be used.

One of the fines rollers 280 may adjustable and one may be fixed. The adjustable roller 280 may be adjusted to the desired engagement and then locked into place by a locking collar or a similar type of device. Any type of adjustment means may be used herein.

The brewing material 105, in this case coffee beans, may be positioned within the inlet bin 290. The brewing material 105 then passes through the crusher rollers 260 such that the brewing material 105 is broken down substantially to the desired size and then passes through the finish rollers 270. The finish rollers 270 are spaced such that the desired particle size is substantially achieved. For example, the desired particle size desired herein may be between about 200 to about 300 microns, with about 250 microns preferred for certain brews. Any desired particle size may be produced. The relatively larger particles produced by the crusher rollers 260 and the finishing rollers 270 provide the finished beverage with its desired strength, intensity, and other taste characteristics.

If a certain amount of fines are desired, the fines rollers 280 are positioned so as to provide the desired size and percentage. As described in more detail below, the fines produced by the fines rollers 280 impact the resistance and brew time of the brewing material 105. The use of more fines generally results in more resistance and a longer brew time.

The grinder 250 also may include a densifier 310. The densifier 310 may be positioned under the fines rollers 270. The densifier 310 may include a number of blades so as to form the individual grinds into a more uniform size and shape. Specifically, the grinds seem to be have a more uniform spherical shape and seem to be somewhat hardened. Densification of the grinds results in changing the brew characteristics in that the increase in density changes the nature of the water flow through the grinds.

In addition to creating substantially uniform spheres, the densifier 310 also seems to reduce the number of fines or small particles by "sticking" the smaller particles to the larger particles. The sticking may be due to the oils in the grinds, the work added to the grinds, or other causes. For example, with densification, solids in the coffee may about six (6) percent. Without densification, however, the solids may reach about 7.5 percent, which provides a finished product that may be too strong. The net result is a smaller, more uniform particle size distribution. Although densification has been used to improve the packing of coffee, densification has not been employed so as to change the brew characteristics of the grinds.

As described above, the roller grinders seem to provide better particle size distribution, i.e., the particle size distribution is more consistent. The roller grinder 250 provides fewer large particles that may tend to under-extract and provide off tastes and fewer fines that tend to alter the taste of the final beverage by over-extracting and contributing to bitterness. The fines also have an impact on the back pressure within the pod cartridge 100 as the back pressure is inversely proportional to the square of the particle size. The back pressure thus increases as the particle size decreases.

Figure 11:
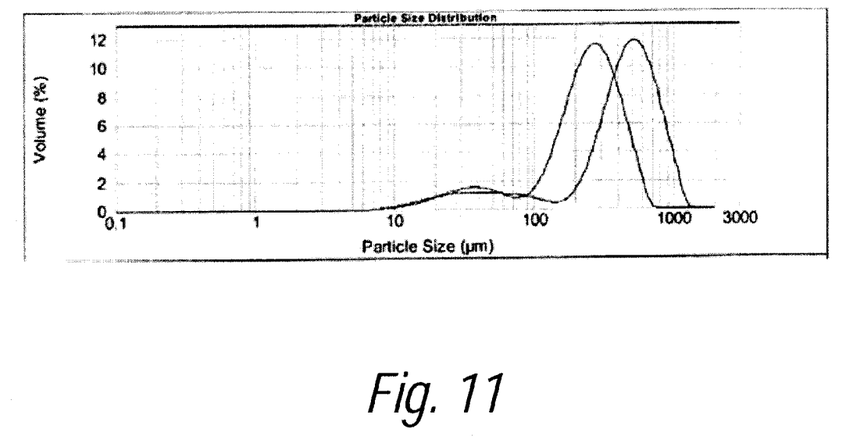
FIG. 11 is a particle size distribution chart.

A comparison between a roller grinder and a burr grinder is shown in FIG. 11. The roller grinder particle distribution (the "Rainforest" grind with the spike to the left) ends at about the 8.0 µm particle size while the burr grinder (the "Milano" grind with the spike to the right) continues to about the 0.1 µm particle size. Likewise, there are fewer larger particles with the roller grinder.

As is shown, over eighty percent (80%) of the grinds ground with the roller grinder 250 have a particle size distribution between about 220 and about 250 microns (micrometers) with over ninety-nine percent (99%) having a particle size distribution between about eight (8) micron and 650 microns. Broadly, over seventy-five percent (75%) percent of the coffee grinds may have a particle size distribution of between about 200 and about 300 microns. Although a consistent particle size distribution of around 250 microns provides an improved beverage for certain types of brews, a certain amount of fine particles also may be desired so as to provide the resistance and desired pressure during brewing. The lack of enough fines may allow the water to pass through too quickly. As such, about ten (10) to about forty (40) percent of the distribution may be in about the forty (40) micron range. Any desired percentage of the fines may be used herein.

The roller grinder 900 thus provides a narrower and more consistent particle size distribution. Similarly, the number of fines can be monitored so as to limit bitterness while maintaining a consistent pressure therethrough. Such a particle size distribution provides a coffee beverage with improved and consistent taste.

In use, the filter paper 220 may be placed with the cup 110 of the pod cartridge 100 along the base 130. An amount of the brewing material 105 then may be positioned therein. An additional layer of the filter paper 220 then may be placed on the brewing material 105 if desired. The lid 190 then may be placed within the cup 110 so as to tamp down the brewing material 105 with about 13.6 kilograms of force (about thirty (30) pounds of force). The amount of force may vary. Once the lid 190 has compacted the brewing material 105, the edge 200 of the lid 190 is positioned within the appropriate cutout 180 within the sidewall 120 of the cup 110. The pod cartridge 100 then may be sealed or otherwise shipped for use with the desired beverage dispenser system or similar type of device.

The pressure of the water flowing through pod cartridge 100 may vary with the nature of the brewing material 105. The hot pressurized water may be provided to the pod cartridge 105 from any source. The nature of the water flow through the pod cartridge 100 as a whole depends in part upon the geometry and size of the cartridge 100, the nature, size, and density of die brewing material 105, the water pressure, the water temperature, and the brew time. With respect to brew time and temperature, brew temperatures are typically in the range of about 85 to about 100 degrees Celsius (about 185 to about 212 degrees Fahrenheit) or sometimes warmer at about 10 to about 14 bar. Altering any of these parameters may alter the nature of the brewed beverage.

Maintaining particle size uniformity, as described above, is preferred. Coffee grind particles that are not the correct size will generally over extract or under extract the soluble solids out of the coffee. The use of the grinder 250 helps to ensure a more consistent particle size. The use of the densifier 310 also assists in providing particle size uniformity. Tamping the coffee grinds down assists in providing uniform fluid flow through the pod cartridge 100. As described above, particle size relates to the back pressure that does the "work" of brewing the beverage.

It should be apparent that the foregoing relates only to the preferred embodiments of the present invention and that numerous changes and modifications may be made herein without departing from the spirit and scope of the invention as defined by the following claims and the equivalents thereof.

We claim:

1. A method of grinding coffee beans, comprising:
   grinding a first plurality of beans in a first plurality of rollers to a particle size of substantially about 250 microns;
   grinding a second plurality of beans in a second plurality of rollers to a particle size of substantially about 40 microns; and
   combining the first plurality of beans and the second plurality of beans.

2. The method of claim 1, wherein the particle size of substantially about 250 microns comprises about 250 microns plus or minus about 20 microns.

3. The method of claim 1, wherein the particle size of substantially about 40 microns comprises about 40 microns plus or minus about 10 microns.

4. The method of claim 1, wherein the second plurality of beans comprises a portion on the first plurality of beans.

* * * * *